United States Patent [19]

Leroy et al.

[11] Patent Number: 4,654,186
[45] Date of Patent: Mar. 31, 1987

[54] DEVICE FOR DETERMINATION OF THE POWER OF A PRESSURIZED WATER NUCLEAR REACTOR

[75] Inventors: Jean L. Leroy, Gif-sur-Yvette; Pierre Ruiz, Blanc Mesnil, both of France

[73] Assignee: Framatome & Cie., Courbevoie, France

[21] Appl. No.: 585,671

[22] Filed: Mar. 2, 1984

[30] Foreign Application Priority Data

Mar. 11, 1983 [FR] France .................................. 83 03999

[51] Int. Cl.⁴ .............................................. G21C 7/36
[52] U.S. Cl. .................................... 376/216; 376/247; 376/254; 364/492
[58] Field of Search ............... 376/216, 217, 247, 254; 364/527, 492

[56] References Cited

U.S. PATENT DOCUMENTS 4,042,813  8/1977  Johnson .............................. 376/217
4,075,059  2/1978  Bruno .................................. 376/217
4,145,922  3/1979  Estrada .............................. 374/39

Primary Examiner—Donald P. Walsh
Attorney, Agent, or Firm—Pollock, Vande Sande & Priddy

[57] ABSTRACT

A device and method for determining the power of a pressurized water nuclear reactor, comprising measurement of the neutron power (15) and of the temperature of the primary fluid in the cold branch (1) and in the hot branch (1'), computing (2, 4, 6, 8, 12) the thermal power of the reactor from these temperature measurements (1, 1'), comparing (14) the thermal power signal (13) and the neutron power signal (16) and correcting (22) the neutron power signal (16). The device in addition comprises means for fast and precise determination of the secondary power of the reactor by comparison of a first signal of the secondary thermal power (13) established by means of the temperature measurements (1, 1') and a second signal of the thermal power (16') established by means of a simplified secondary heat balance (25).

11 Claims, 1 Drawing Figure

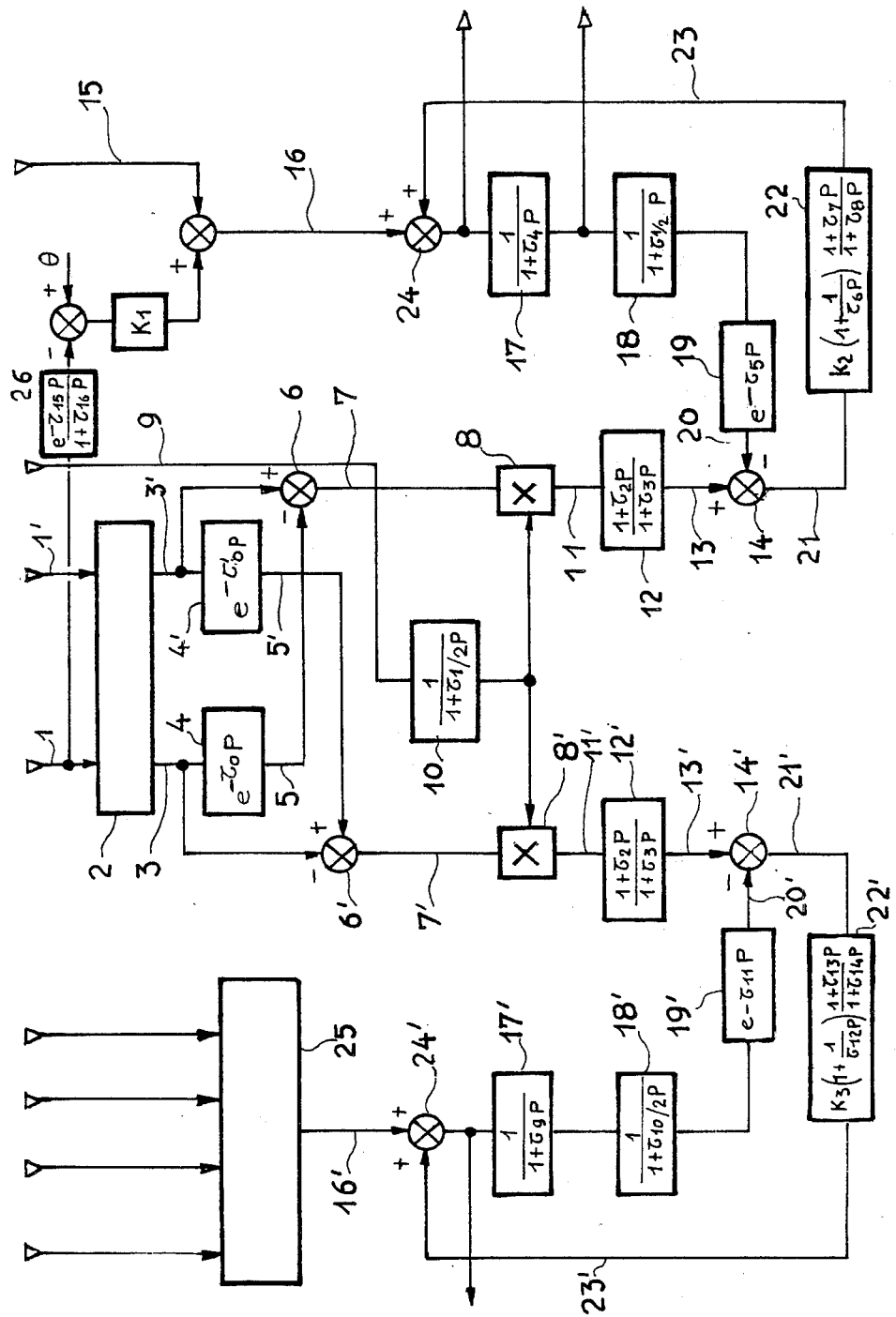

DEVICE FOR DETERMINATION OF THE POWER OF A PRESSURIZED WATER NUCLEAR REACTOR

FIELD OF THE INVENTION

The present invention relates to the determination of the power of a pressurized water nuclear reactor which comprises at least one cooling loop and preferably three or four loops.

It is important to know the power of a nuclear reactor at any time, particularly for safety reasons.

PRIOR ART

The present practice is to employ neutron detectors installed outside the reactor vessel for measuring the power. Such detectors give signals with a fast response but have the disadvantage of giving signals of low precision, particularly during periods of transient operation.

To obtain more precise results, the reactor power can be computed from a heat balance calculated from measurements of the temperature of the primary fluid in the cold branch and in the hot branch of the primary loops. However, while the results obtained in this way are precise, they are nevertheless slow because of the high time constant of the temperature variations.

Devices which permit the power of a nuclear reactor to be correctly determined in respect of both precision and speed are known, e.g. from, French Pat. No. 2,373,057, which describes an apparatus permitting the reactor power to be determined from the increase in core enthalpy, this enthalpy increase being computed by making use of the velocity of sound in the fluid in the hot and cold branches of the primary circuit. However, this apparatus involves installation of sensors on the primary circuit pipework, the major disadvantage being the increase in the number of connections to the said pipework and the resulting increase in the difficulty of lagging it.

U.S. Pat. No. 3,752,735 describes a device which makes it possible to produce a signal representing the thermal power of the core by using the measurement of hot branch temperature and cold branch temperature and compensating these temperature measurements dynamically, following a formula which involves the time derivative of the difference between the hot branch temperature and the cold branch temperature. Such a device permits a fast response signal to be obtained, but the formula which is employed to obtain this signal is only approximate and renders the signal somewhat inaccurate.

French Patent Application No. 2,416,531 describes a process for determining the power of a nuclear reactor in which a thermal power signal which has a high time constant but is relatively precise is combined with a neutron power signal which has a fast response but is less precise. Nevertheless this process does not produce very precise results in a transient regime, because it merely adjusts the thermal power signal by means of a neutron power signal which is delayed by a gain control unit 6 and an integrating unit 7 (FIG. 1). It does not take into account numerous data which can vary in a transient regime.

Furthermore, to date there has been no known simple device enabling both the primary power and the secondary power of a nuclear reactor to be obtained rapidly and precisely both in steady state operation and in transient operation.

SUMMARY OF THE INVENTION

The object of the present invention is to remedy the disadvantages of the aforesaid processes and devices. It relates to a device for fast and precise determination of the power of a pressurized water nuclear reactor having one or more cooling loops, in steady state operation and during periods of transient operation. Moreover, in a preferred embodiment, it also makes it possible to obtain, in an equally simple, fast and precise manner, the secondary power, i.e., the power of the steam generators in each cooling loop of the reactor.

According to the invention the device comprises, for each of its cooling loops:

means for measuring, on the one hand, the neutron flux and, on the other hand, the temperature of the primary fluid at a point in the cold branch and at a point in the hot branch, means for computing the enthalpy of the primary fluid in the cold branch and in the hot branch from the said temperature measurements, a register which computes the enthalpy increase of the primary fluid as it crosses the core, from the difference between the enthalpy in the hot branch and the enthalpy in the cold branch delayed by a time shift operator expressing the average time of transit of a molecule of fluid between the temperature measurements points in the cold branch and in the hot branch, a multiplier of the increase in the enthalpy by the flow rate of the primary fluid, a comparator of the thermal power signal which is obtained and of the neutron power signal which is measured and made dynamically equivalent to the thermal power signal, and a corrector of the neutron power measurement signal depending on the signal produced by the said comparator.

In a preferred embodiment of the invention, the neutron power measurement signal is made dynamically equivalent to the thermal power signal by means of a point model of heat transfer between the nuclear flux and the thermal flux to the primary fluid, of a point model of heat transfer of the fluid in the core corresponding to the time of transit of a molecule of primary fluid from the center of the core, to the outlet of the core and a time shift operator expressing the time of transit of a molecule of primary fluid from the core outlet to the point of measurement of the hot branch temperature.

The corrector of the neutron power measurement signal is preferably an integrator.

Moreover, it is preferable to correct the neutron power measurement signal for variations of the temperature measured in the cold branch before this signal is compared to the thermal power signal.

It is advantageous to supplement the device according to the invention with a filter of the primary flow rate signal which is situated upstream of the said multiplier in order to allow for variation of the average time of transit of a molecule of primary fluid from the cold branch to the hot branch depending on the primary flow rate.

It is further preferred to supplement the device for fast and precise determination of the primary power of a nuclear reactor as described above, by a device for rapid and precise determination of the secondary power of the reactor, comprising, for each loop, in addition to the aforesaid means for measuring temperature and for computing the enthalpy in the cold branch and in the hot branch, imprecise but fast means for determining the thermal power produced by the steam generator associated with the reactor from measurements of the temperature and the flow rate of the feed water and of the pressure and the flow rate of the steam from the steam generator, a register computing the reduction in the enthalpy of the primary fluid as it crosses the steam generator from the difference between the enthalpy in the hot branch and in the cold branch, the enthalpy in the hot branch being delayed by a time shift operator expressing the time of transit of a molecule of fluid between the two temperature measurement points, a multiplier of the decrease of enthalpy by the flow rate of the primary fluid, a comparator of the signal, which is obtained at the multiplier output, of the thermal power absorbed by the steam generator to the said signal, as determined above, of the thermal power produced by the steam generator, this signal being made dynamically equivalent to the signal of thermal power absorbed by the steam generator, and a corrector of the signal of power produced by the steam generator depending on the signal produced by the said comparator.

Preferably, the measurement signal of the thermal power produced by the steam generator is made dynamically equivalent to the signal of the thermal power absorbed by the steam generator by means of a point model of heat transfer between the secondary fluid and the primary fluid, a point model of heat transfer of the primary fluid in the steam generator corresponding to the time of transit of a molecule of primary fluid from the center of the steam generator to the outlet of the steam generator, and a time shift operator expressing the time of transit of a molecule of primary fluid from the outlet of the steam generator to the point of measurement of the cold branch temperature.

It is preferred to use an integrator to correct the measurement signal of the thermal power which is absorbed by the steam generator.

The dynamics of the measurements of the primary fluid temperature in the cold branch and the hot branch are furthermore compensated by a phase lead corrector which is placed at the output of the multiplier of the variation of the enthalpy of the primary fluid by the flow rate of the primary fluid.

BRIEF DESCRIPTION OF THE DRAWING

The following more detailed description will enable the invention to be better understood, with reference to the diagram of the attached single FIGURE which shows an embodiment of the invention as applied to a pressurized water nuclear reactor comprising, for ease of understanding, only one loop.

DETAILED DESCRIPTION

The core of the nuclear reactor is crossed in a known manner by a primary fluid which circulates in a primary loop; this fluid absorbs energy as it passes through the core and gives up its energy during its passage through the steam generator to a secondary fluid circulating in a secondary loop. The primary circuit comprises a cold branch and a hot branch, the cold branch being of course placed between the steam generator and the core and the hot branch between the core and the steam generator, in the direction of flow of the fluid.

The temperature of the primary fluid is measured at two points in a conventional manner, one of the points being situated on the cold branch and the other point being situated on the hot branch. In FIG. 1, the cold branch temperature signal is designated by 1 and the hot branch temperature signal by 1'.

An operator 2 computes, in a conventional manner, the value of the enthalpy at the point of temperature measurement in the cold branch and the point of temperature measurement in the hot branch. The enthalpy can, for example, be determined by a second degree polynomial in T where T, is the measured temperature. To obtain improved precision, the computation can also be carried out using a third degree polynomial. Two signals 3 and 3' are thus obtained for enthalpy in the cold branch and for enthalpy in the hot branch.

Two time shift operators 4 and 4' permit the signals 3 and 3' respectively to be delayed. The transfer functions employed are respectively $\epsilon^{-\tau_0 p}$ and $\epsilon^{-\tau'_0 p}$ where $\tau_0$ and $\tau'_0$ represent, respectively, the total average time of transit of a molecule of primary fluid between the points of temperature measurement in the cold branch and in the hot branch, and the total average time of transit of a molecule of primary fluid between the points of temperature measurement in the hot branch and in the cold branch (p being the LAPLACE variable). For increased precision, it may be taken into account that the above-mentioned time of transit can be different for two different molecules of water; in particular, the reactor configuration is such that, generally speaking, water molecules have very different speeds at the outlet of the core. It would therefore be possible, using an integrator, to take these different times of transit into account instead of considering only the average time, as shown in FIG. 1.

Signals 5 and 5' are obtained at the output of the time shift operators 4 and 4' and are then entered into the registers 6 and 6'.

The register 6 produces the difference between the hot branch enthalpy signal 3' and the cold branch enthalpy delayed signal 5. the output signal of the register 6 is designated by 7. The register 6' produces the difference between the hot branch enthalpy delayed signal 5' and the cold branch enthalpy signal 3. The output signal of the register 6' is designated by 7'.

Signals 7 and 7' are entered respectively into multipliers 8 and 8' where they are multiplied by the primary flow rate signal 9, the latter being measured in a completely conventional manner. To increase the precision, the primary flow rate signal 9 is filtered at 10 to take account of the variation in the average time of transit of a molecule of fluid through the core. The transfer function of the filter is in this case $$\frac{s}{s + \frac{\tau}{2} p}$$

where $\tau_1$ represents the average time of transit of a molecule of primary fluid through the core.

At the output of the multiplier 8 a primary thermal power signal 11 is obtained, and at the output of the multiplier 8' a signal 11' is obtained which represents the thermal power absorbed by the steam generator.

The dynamics of the primary fluid temperature measurements in the cold branch and in the hot branch are compensated by two identical phase lead correctors 12 and 12' into which the signals 11 and 11' are entered, respectively. The output signals of these correctors are shown as 13 and 13'. The transfer function of these correctors is $$\frac{s + \tau_2 p}{s + \tau_3 p}$$

where $\tau_2$ is the time constant of the temperature measurements (measurement corrector) and where $\tau_3$ is a reduction filter of the transient gain of the measurement corrector.

Signals 13 and 13' are then entered into the comparators 14 and 14' where they are compared respectively to a neutron power signal and to a signal representing the thermal power produced by the steam generator.

The neutron power signal is obtained in a conventional manner by means of neutron flux measurement chambers which are situated outside the core. The neutron power signal is shown as 15. Signal 15 is corrected as a function of the temperature variations by the use of a correction coefficient K1 between the measurement of neutron flux and the temperature of the annular space in which the neutron power chambers are conventionally situated, it being possible for this temperature to be taken as similar to the cold branch temperature. In FIG. 1, of course, $\theta$ represents a nominal temperature. In order to respect the signal phase as well as possible in transient operation, the temperature correction is shifted in time by the term $\epsilon^{-\tau_{15}p}$ ($\tau_{15}$ is the time of transit between the cold branch measurement point and the core entry). To this term may be added a low-pass filter $$\frac{s}{s + \tau_{16} p}$$

to allow for the time required by the flux measurement chambers to respond to a variation in the temperature of the cold branch. 16 refers to the neutron power signal which has been corrected for temperature.

Signal 16 is made dynamically equivalent to signal 13 by means of a point model 17 of heat transfer between the nuclear flux and the thermal flux of the primary fluid ($\tau_4$ represents the time constant of heat transfer); the output signal of the model 17 is then entered into a point model of heat transfer of primary fluid in the core corresponding to the time of transit $\tau_1/2$ of a molecule of primary fluid from the center of the core to the outlet of the core.

The output signal of the model 18 is then delayed by a time shift operator 19 expressing the time of transit $\tau_5$ of a molecule of primary fluid from the outlet of the core to the point of temperature measurement in the hot branch.

The neutron power signal which has been made dynamically equivalent to the signal of primary thermal power is shown as 20. Signal 20 is compared to signal 13 in the comparator 14. The signal 21 which is produced by this comparator is used for correcting the neutron power signal 16 by means of a corrector 22. This corrector 22 comprises an integrator with an integration constant $\tau_6$ and gain $k_2 \cdot \tau_7$ and $\tau_8$ are respectively, phase lead and phase delay time constants, $\tau_8$ being smaller than $\tau_7$.

The signal 23 produced by the corrector 22 is added to the signal 16 in the register 24.

At the output of the register 24 a normalized signal of neutron power is obtained, and at the output of the model 17 a normalized signal of thermal power is obtained.

The device according to the invention thus permits a fast and precise signal of the primary power of the reactor to be obtained by means of only two temperature-measuring sensors and conventional chambers for measuring neutron power.

The device according to the invention further permits a fast and precise signal of the secondary power of the reactor to be obtained by means of the same two temperature sensors, as will be described hereafter.

To produce a fast and precise signal of the secondary power of the reactor, signal 13' is compared, at 14', to a signal representing the thermal power produced by the steam generator of the cooling loop under consideration; this signal, which is derived from a simplified secondary balance, lacks precision but has the great advantage of being a fast-response signal. This signal 16' is produced in a computer 25 from four signals, namely the temperature and the flow rate of the steam generator feed water, together with the pressure and the flow rate of steam produced by the steam generator.

The signal 16' is made dynamically equivalent to the signal 13' by means of a point model 17' of heat transfer between the secondary fluid and the primary fluid ($\tau_q$ is the time constant of heat transfer). The model 17' is followed by a point model 18' of heat transfer of the primary fluid in the steam generator corresponding to the time of transit $\tau Hd\ 10/2$ of a molecule of primary fluid from the center of the steam generator to the outlet of the steam generator. A time shift operator 19' enables the time of transit $\tau_{11}$ of a molecule of primary fluid from the outlet of the steam generator to the point of temperature measurement in the cold branch to be taken into account. At the output of the operator 19' a signal 20' is obtained which represents the thermal power produced by the steam generator, this signal being made dynamically equivalent to the signal 13' representing the thermal power absorbed by the steam generator.

These two signals 20' and 13' are compared in the comparator 14'. The signal 21' produced by the comparator 14' is entered in a corrector 22'. The signal 23' produced by this corrector is used to correct the signal 16' to which it is added in a register 24'. In this case the corrector 22' is an integrator whose integration constant is $\tau_{12}$ and gain $k_3$. $\tau_{13}$ and $\tau_{14}$ are time constants of the phase advance and phase lag of the corrector ($\tau_{14}$ is smaller than $\tau_{13}$).

A fast and precise signal of normalized secondary power is obtained at the output of the register 24'.

The device according to the invention thus makes it possible to obtain at any time a fast and precise signal of primary power (neutron power and thermal power transmitted at the center of gravity of the core) and of secondary power, using two temperature sensors in the cold branch and the hot branch, neutron power measurement chambers and a simplified secondary balance. This device is of particular advantage during periods of transient operation. It permits instant detection of any variation in the primary or secondary power, permitting possible failures which have caused these variations to be remedied very quickly. The device according to the invention contributes to a proper protection of the core, particularly in the high performance reactors which are constructed at present.

The correctors 22 and 22' may be designed differently so as to optimize the response of the correction signal. Furthermore, the registers 24 and 34 could be replaced by multipliers to preserve the measurement zero.

The example described relates to a single loop, but the invention can of course apply to a reactor with several loops.

We claim:

1. A device for rapid and precise determination of the power of a pressurized water nuclear reactor in steady state operation and during periods of transient operation, said reactor having a core and cooling loops having a cold branch and a hot branch, said device comprising, for each cooling loop
   (a) means for measuring, on the one hand, the neutron power (15) and, on the other hand, the temperature of the primary fluid at a single point in said cold branch and at a single point in said hot branch;
   (b) means for computing the enthalphy of the primary fluid in said cold branch and in said hot branch from said temperature measurements;
   (c) a register (6) which computes an enthalpy increase (7) of said primary fluid as it flows through said core, from the difference between the enthalpy (3') in said hot branch and the enthalpy (3) in said cold branch, delayed by a time shift operator (4) expressing the average time of transit $\tau 0$ of a molecule of primary fluid between said two points of temperature measurement;
   (d) a multiplier (8) of said increase in the enthalpy (7) by the flow rate of said primary fluid (9);
   (e) a comparator (14) of a thermal power signal which is obtained (11) and of a neutron power signal which is measured (15) and made dynamically equivalent to said thermal power signal (11); and
   (f) a corrector of the neutron power measurement signal (15) depending on the signal (21) produced by said comparator (14).

2. The device as claimed in claim 1, wherein said neutron power measurement signal (15) is made dynamically equivalent to said thermal power signal (11) by means of a point model (17) of heat transfer between the nuclear flux (15) and the thermal flux to said primary fluid, of a point model (18) of heat transfer of said primary fluid in the core, corresponding to the time of transit $\tau_i/2$ of a molecule of primary fluid from the center of said core to the outlet of said core, and by means of a time shift operator (19) expressing the time of transit $\tau_5$ of a molecule of primary fluid from the core outlet to the point of temperature measurement in said hot branch.

3. The device as claimed in claim 1 or 2, wherein the corrector (22) of said neutron power measurement signal (15) is an integrator.

4. The device as claimed in claim 1 or 2, comprising means for correcting, before its comparison to said thermal power signal (11), the neutron power measurement signal (15) for the temperature variations in the cold branch said, means comprising a correction coefficient ($K_1$).

5. The device as claimed in claim 4, comprising means for delaying the cold branch temperature signal employed to correct said neutron power measurement signal (15), said means comprising a time shift operator expressing the time of transit $\tau_{15}$ of a molecule of primary fluid between the point of temperature measurement in said cold branch and the core inlet.

6. The device as claimed in claim 5, comprising means for filtering said cold branch temperature signal to take account of the response time of said neutron power measurement signal (15) to a variation of the cold branch temperature.

7. The device according to claim 1 or 2, further comprising a device for fast and precise determination of the secondary power of said reactor, comprising for each cooling loop, in addition to said means for measuring temperature and computing the enthalpy in said cold branch and in said hot branch, imprecise but rapid means (25) for determining the thermal power produced by a steam generator associated with said reactor, a register (6') computing the reduction in the enthalpy of said primary fluid as it flows through said steam generator, from the difference between the enthalpy in said hot branch (3'), and in said cold branch (3), the enthalpy in said hot branch (3') being delayed by a time shift operator (4') expressing the time of transit $\tau_o$ of a molecule of primary fluid between the two temperature measurement points, a multiplier (8') of the decrease of enthalpy (7') by the flow rate (9) of said primary fluid, a comparator (14') of a signal (11') which is obtained at a multiplier output (8'), of the thermal power absorbed by the steam generator, to a signal (16') of the thermal power produced by said steam generator and determined by the said thermal power determining means (25), this signal (16') being made dynamically equivalent to the signal (11') of thermal power absorbed by the steam generator and a corrector (22') of the signal (16') of the thermal power produced by the steam generator depending on the signal (21') produced by said comparator (14').

8. The device as claimed in claim 7, comprising means for making the measurement signal (16') of the thermal power produced by said steam generator dynamically equivalent to the signal (11') of thermal power absorbed by said steam generator, said means comprising a point model (17') of heat transfer between the secondary fluid and said primary fluid passing through the steam generator, of a point model (18') of heat transfer of said primary fluid in said steam generator, corresponding to the time of transit $\tau_{10}/2$ of a molecule of primary fluid from the center of said steam generator to the outlet of said steam generator and by means of a time shift operator (19') expressing the time of transit $\tau_{11}$ of a molecule of primary fluid form the outlet of said steam generator to the point of measurement of the cold branch temperature.

9. The device as claimed in claim 7, wherein the corrector (22') of said measurement signal (16') of the thermal power absorbed by said steam generator is an integrator.

10. The device as claimed in claim 7, comprising means for compensating the dynamics of the measurements of the temperature of said primary fluid in said cold branch and said hot branch, said means comprising a phase lead corrector (12, 12') placed at the output of the multiplier (8, 8') of the change in enthalpy (7, 7') of the primary fluid by the flow rate (9) of the primary fluid.

11. The device as claimed in claim 7, comprising means for filtering the signal (9) of the primary flow rate before being entered into said multipliers (8, 8') in order to take account of the variation of the average time of transit $\tau_1$ of a molecule of primary fluid passing through said core.

* * * * *